Figure 4:
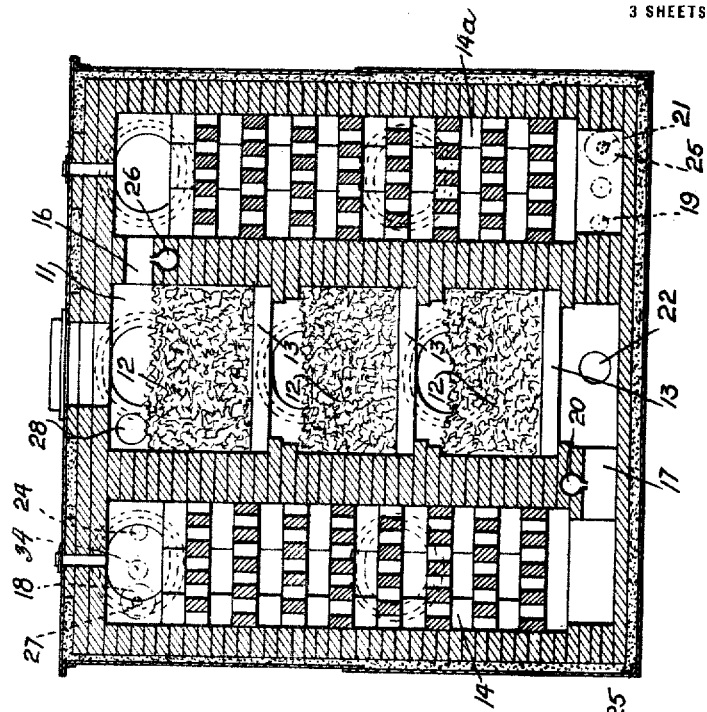

F. D. MOSES.
APPARATUS FOR MAKING HYDROGEN.
APPLICATION FILED SEPT. 13, 1917.
1,306,831.
Patented June 17, 1919.
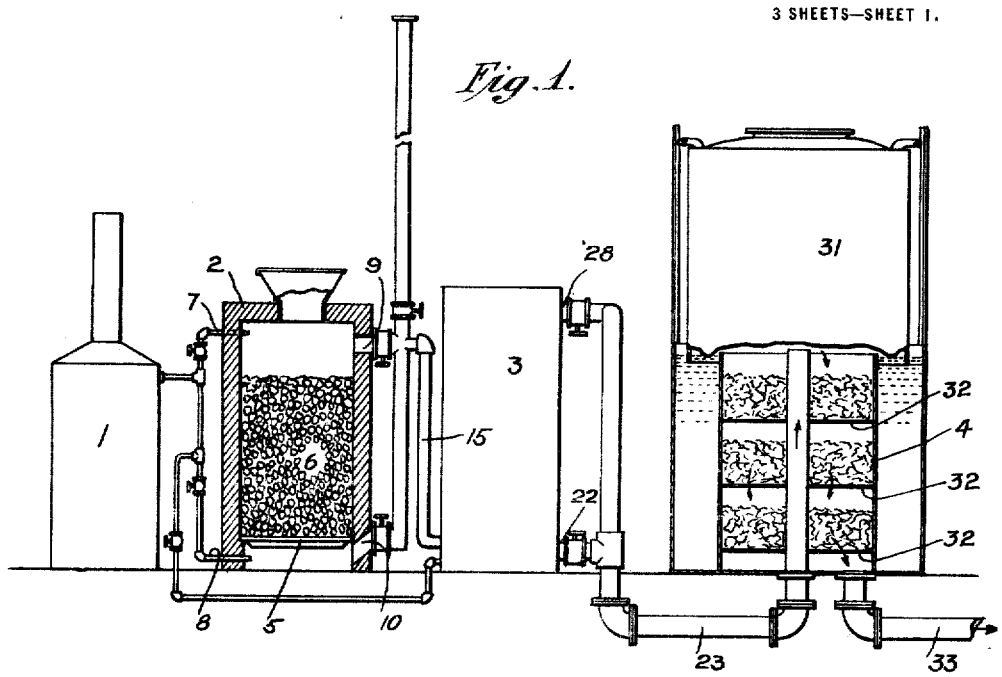
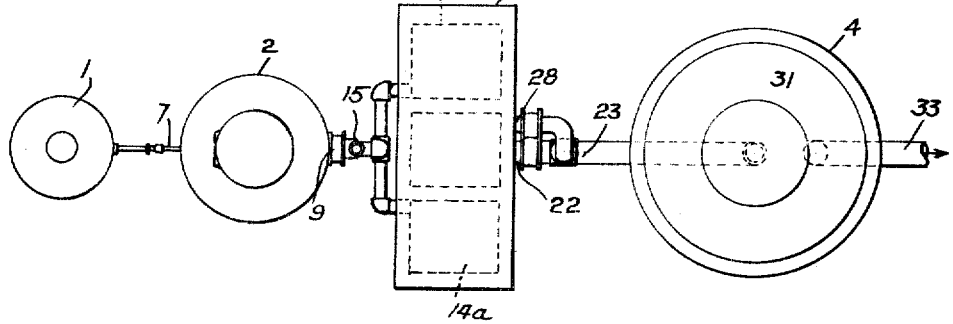
WITNESSES:
INVENTOR.
Frank D. Moses
BY
ATTORNEYS

F. D. MOSES.
APPARATUS FOR MAKING HYDROGEN.
APPLICATION FILED SEPT. 13, 1917.

1,306,831.

Patented June 17, 1919.
3 SHEETS—SHEET 2.

WITNESSES:
C. O. Mitchell
George Kerek

INVENTOR.
Frank D. Moses
BY
Marbles Everett
ATTORNEYS.

F. D. MOSES.
APPARATUS FOR MAKING HYDROGEN.
APPLICATION FILED SEPT. 13, 1917.

1,306,831.

Patented June 17, 1919.
3 SHEETS—SHEET 3.

WITNESSES:

INVENTOR.
Frank D. Moses
BY
ATTORNEYS.

UNITED STATES PATENT OFFICE.

FRANK D. MOSES, OF TRENTON, NEW JERSEY.

APPARATUS FOR MAKING HYDROGEN.

1,306,831.              Specification of Letters Patent.      Patented June 17, 1919.

Application filed September 13, 1917.   Serial No. 191,251.

*To all whom it may concern:*

Be it known that I, FRANK D. MOSES, a citizen of the United States of America, and a resident of Trenton, New Jersey, have invented new and useful Improvements in Apparatus for Making Hydrogen, of which the following is a specification.

My invention relates to an apparatus for the production of hydrogen gas, and comprises a complete and practically self-contained hydrogen gas plant wherein the several elements are much more intimately related than has been the case heretofore, with resulting higher efficiency and greater compactness. Other features of my invention will be pointed out hereinafter.

The objects of my invention are to improve and simplify apparatus for the absorption process of making hydrogen; and to produce a hydrogen gas making apparatus of great simplicity and compactness, and which is capable of being operated very readily. Other objects of my invention will be pointed out hereinafter.

I will now proceed to describe my invention with reference to the accompanying drawings, in which one type of apparatus embodying my invention is illustrated, and will then point out the novel features and claims.

Figure 3:
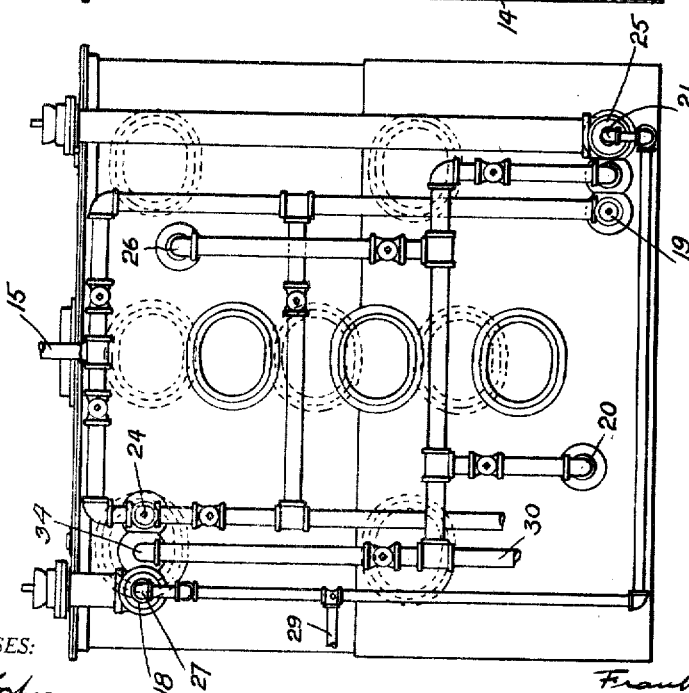
Figure 5:
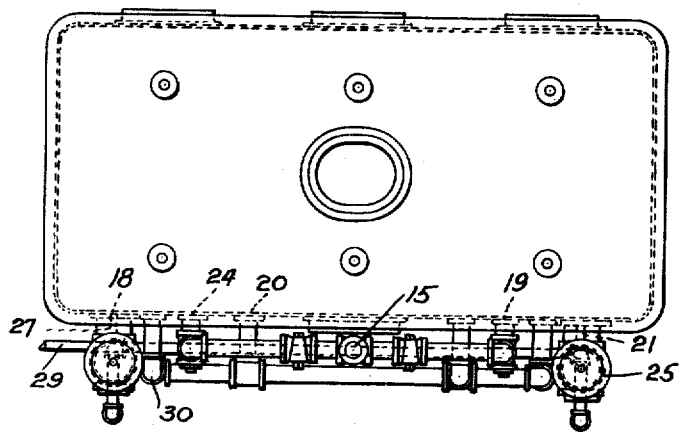
Figure 6:
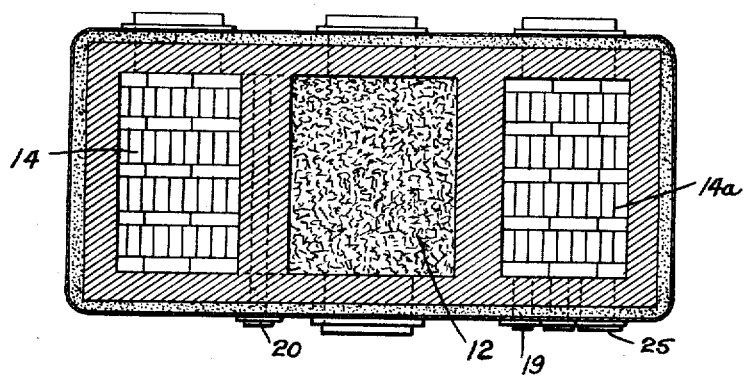

In the drawings:

Figure 1 shows schematically an elevation and partial section of apparatus embodying my invention, Fig. 2 shows similarly a top view of the said apparatus; Fig. 3 shows a front elevation of the hydrogen generator, and Fig. 4 a central vertical section of that generator on a plane parallel with that of Fig. 3; Fig. 5 shows a top view of the said hydrogen generator, and Fig. 6 a horizontal section thereof.

In the said drawings 1 designates a source of water vapor (for example, a steam boiler); 2 designates a water gas producer of substantially the ordinary type; 3 designates a so-called hydrogen generator (shown more in detail in Figs. 3–6 inclusive); and 4 designates a combined gasometer and purifier. The steam boiler 1 may be, of course, of any suitable construction. The gas producer 2 is of a substantially ordinary type and preferably uses coke as fuel. It comprises a grate 5, upon which is a fuel bed 6, the producer having upper and lower steam and air inlets 7 and 8 and suitably valved upper and lower gas outlets 9 and 10.

The steam and gas connections of the water gas generator are so arranged that the steam may be passed down through the fuel bed, or up through the fuel bed, as desired, and the gas out under the grates or out above the fuel bed of the generator, as desired.

The hydrogen generator 3 (see Figs. 3–6 inclusive) comprises an inner chamber 11, having within it a greater or lesser number of bodies of oxid 12, resting upon suitable grates 13; and this hydrogen generator has also a plurality of checker-work chambers 14 and 14$^a$, which are duplicates of one another, and, in the main, are used in alternation, as hereinafter described. From the hydrogen generator the gas passes directly to the combined gasometer and purifier 4.

The following is the operation of the apparatus as so far described:

After the various parts of the apparatus are properly connected, the water gas generator is filled with fuel (preferably coke) and a fire started. An air blast is admitted under the grate bars and the products of combustion pass out from the top of the fuel bed to an outside pipe with valve open to the atmosphere. After the fuel bed has been brought to the proper state of incandescence, the air blast is reduced, the valve to the atmosphere is shut off and the valve allowing the gas to pass to the hydrogen generator is opened. Producer gas, which is formed by the partial combustion of the fuel bed resulting from the admittance of air under the grate, is taken off the top of the fuel bed in the water gas generator, passed through connecting pipe 15 and admitted to superheater 14 of hydrogen generator 3 at inlet 24. Air is admitted at 34 and the mixture ignited, then it passes down through superheater 14, through connection 17 and up through the iron mass in chamber 11, through connection 16, down through superheater 14$^a$ and out to atmosphere at 25. This is continued until the iron mass in chamber 11 reaches a temperature of about 850 centigrade. Then the air blast under the grate in the water gas generator 2 is shut off and steam is admitted at this point. The steam passes up through the incandescent fuel bed in the generator and is decomposed, its oxygen combining with the carbon of the fuel to form CO which mingles with the hydrogen of the steam. This gas passes off at the top of the fuel bed and through pipe 15 to inlet 24 in superheater 14. The gas passes down through 14, through 17 into chamber 11 and passes up through the heated iron mass. This iron mass consists of pieces of porous iron oxid, and at the temperature to which it has been heated it gives up some of its oxygen to the CO forming $CO_2$, and to the hydrogen, forming $H_2O$. This period continues for about 20 minutes, when the iron mass has been reduced to a semimetallic state and chemical action ceases. After passing through the iron mass considerable of the gas remains in its original state and air is admitted at 26, combustion takes place and the gas is burned in passing down through chamber 14ª, heating up the checker brick in that chamber. The resulting products of combustion pass out through 25 to the atmosphere.

The valve from the water gas generator 2 to the hydrogen generator is then shut off, and steam is admitted at 27, passes down through superheater 14 and up through the iron mass in 11. The steam is superheated from contact with the hot checker brick in 14, and when it comes in contact with the hot iron mass, it gives up oxygen to the iron, which again becomes iron oxid, and the hydrogen passes off free at 28. This period continues for about 10 minutes, when the iron mass has been cooled to such an extent that chemical action ceases.

During this interval the water gas generator 2 is heated up to the proper temperature again by the admittance of an air blast under the grate.

The steam is then shut off from the hydrogen generator, and is admitted to the top of the water gas generator 2, passing down through the fuel bed and again forming CO and hydrogen (with a small percentage of O and $CO_2$, etc.) which is now admitted to superheater 14ª through 19. The same procedure is followed as previously outlined except that the flow of gas and steam is reversed through the hydrogen generator, first passing up through superheater 14ª, down through the iron mass in chamber 11, and up through the superheater 14. The reducing and gas making periods are continued alternately, first passing through the hydrogen generator in one direction, then in the other.

31 designates the ordinary bell chamber of a gasometer or gas holder, and 32 a series of trays holding purifying material. The gas from the hydrogen generator 3 passes through the pipe 23 directly to the bell chamber and thence downward through this purifying material. While the operation of the generator 3 is necessarily intermittent, as previously described, by turning this gas directly into the gas holder, and thence causing the gas to pass from the gas holder down through the gas purifier and thence out through pipe 33, constant purifying action is obtained; that is to say, the purifier operates constantly and with substantially intermittent operation of the hydrogen generator. The best results are obtained, with minimum size and weight of apparatus, by so coördinating the capacity of the gas holder and gas purifier to the capacity of the gas generator, that the gas holder will be practically empty at the beginning of the gas making operation in the hydrogen generator 3, and will be filled by the time the oxid absorbing material of that hydrogen generator 3 is oxidized to the maximum practicable working extent.

While I have referred to the oxygen absorbing material in the hydrogen generator as a metallic material, I do not limit myself to any particular substance for the purpose, the terms "metallic" and "metallic oxid" having been used in this specification purely for convenience and in an illustrative capacity.

What I claim is:

1. In gas making apparatus such as described, the combination of a gas producer and a gas generator, the latter of the alternate reduction and oxygen absorbing type, said generator arranged to be heated by the combustion of gas supplied by the producer and in turn to heat incoming gas and water vapor, means for the supply of water vapor to the gas generator, and a combined gas purifier and holder, comprising a gas holder adapted to receive gas direct from said generator and comprising also a purifier through which such gas is passed from the holder, said gas holder and purifier so coördinated as to capacity with the gas making capacity of the generator that the gas holder will be substantially filled at the conclusion of the gas making operation of the gas generator and will be approximately empty at the end of the heating up period and beginning of the gas making period of the generator.

2. In gas making apparatus such as described, the combination in a single structure of an oxid chamber and two checker chambers, one on each side of the oxid chamber and separated therefrom by a suitable wall, there being in one such wall a passage connecting the lower portion of one checker chamber with the lower portion of the oxid chamber, with air inlet means, and there being in the other such wall a passage connecting the upper portion of the other checker chamber with the upper portion of the oxid chamber, the first-mentioned checker chamber having means for the admission of producer gas, steam and air to its upper portion, and for the escape of products of combustion, the second-mentioned checker chamber having means for the admission of producer gas, steam and air to its lower portion, and for the escape of products of combustion, at least one side of the oxid chamber not being blanketed by a checker chamber.

In testimony whereof I have signed this specification in the presence of two subscribing witnesses.

FRANK D. MOSES.

Witnesses:
 GODFREY N. HART,
 H. M. MARBLE.